No. 883,867. PATENTED APR. 7, 1908.
G. ELSEY & B. J. WAYT.
ANIMAL TRAP.
APPLICATION FILED DEC. 7, 1907.

UNITED STATES PATENT OFFICE.

GEORGE ELSEY AND BENJAMIN J. WAYT, OF CHICAGO, ILLINOIS.

ANIMAL-TRAP.

No. 883,867.  Specification of Letters Patent.  Patented April 7, 1908.

Application filed December 7, 1907. Serial No. 405,592.

*To all whom it may concern:*

Be it known that we, GEORGE ELSEY and BENJAMIN J. WAYT, citizens of the United States of America, and residents of Chicago, county of Cook, State of Illinois, have invented certain new and useful Improvements in Animal-Traps, of which the following is a specification.

The main object of this invention is to provide a simple, durable and inexpensive construction for animal traps, particularly such as are intended for catching small animals, like rats and mice.

This object is accomplished by the device shown in the accompanying drawings, in which—

Figure 1:
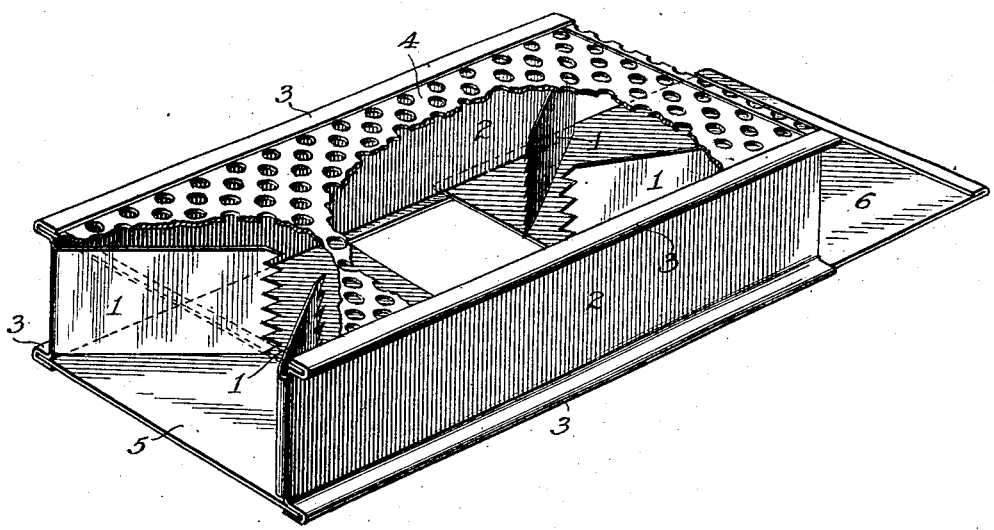
Figure 2:
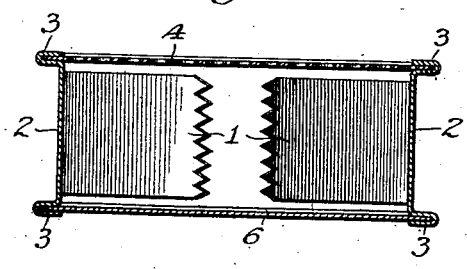

Figure 1 is a perspective view, partly broken away, of a mouse trap constructed according to this invention. Fig. 2 is a transverse section of the same.

In the construction shown in the drawings, the trap comprises a substantially rectangular receptacle or box, preferably constructed entirely of sheet metal, open at its ends, and having the openings guarded by inwardly converging, flat spring tongues 1. Each end opening or entrance passage is guarded by a pair of the springs 1, which extend inwardly and converge toward each other, being provided with prongs, preferably in the form of saw teeth, at their inner ends, and said toothed ends having a space between them through which the animal enters. These springs yield so that the animal may readily enter the receptacle, and the teeth prevent the animal from withdrawing its body after a part thereof has passed inward of the teeth, as will be readily understood.

The tongues 1 are preferably integral with the adjacent side walls 2 of the receptacle. The blank from which each side 2 is formed is cut to the form of a rectangle having a wing extending from each of its sides, the end wings having teeth cut at their free ends and forming the tongues 1, and the longitudinal wings forming the flanges 3 which, when bent to shape, engage the top and bottom walls of the receptacle. The wings 3 are first flanged outward, and then bent back upon themselves, as shown in the drawings, so as to provide grooves into which the edges of the top and bottom walls are inserted.

In the form shown, the top wall 4 is formed of screen material, preferably perforated sheet metal, which permits the contents of the receptacle to be seen, and the bottom wall is preferably made of two separate parts 5 and 6. It is preferred to press the flanges so as to tightly grip the top and bottom pieces 4 and 5, and thus hold the parts together without necessitating the use of solder or other fastening means. The parts of the lower flanges which engage the slide 6 are, however, left sufficiently loose to permit said slide to be easily slid into and out of its closed position.

The bait is inserted by opening the slide 6. The angle between the tongues 1 is such that the animal may partly enter the opening from the outside without any resistance whatever. As soon as the animal feels the pressure of the springs, it is too late for it to withdraw its body, as the teeth are so disposed that they would force themselves into the animal's body through such outward movement. The animal must, therefore, enter the trap after once having inserted a part of its body into the opening. To remove the animal, the slide 6 is opened.

The word "receptacle" is herein intended to include in its meaning any container, regardless of its shape. The word "wall" is herein intended to include in its meaning any structure serving as a boundary of a receptacle or container,—for instance, a vertical side wall, a partition, the top or bottom.

What we claim as our invention and desire to secure by Letters Patent is:—

1. An animal trap, comprising a receptacle having walls and having an opening for admitting the animal, the walls at opposite sides of said opening being formed of sheet metal and each having an integral tongue extending into said opening, said tongues converging inwardly, being provided with prongs at their inner ends, and each being free to yield to admit the animal.

2. An animal trap, comprising a receptacle having walls and open at one end, opposite walls of said receptacle being bent upon themselves along corresponding edges for slidably engaging the edges of a third wall, and a spring tongue integral with one of said walls and extending inwardly of said open end, said tongue having prongs at its end and converging toward the opposite wall.

3. An animal trap, comprising a rectangular receptacle open at one end, the side walls being formed of sheet metal and each having an integral tongue bent inwardly at said open end, said tongues converging toward each other and being toothed at their inner ends, said side walls being flanged at their upper and lower edges and the flanges being bent upon themselves longitudinally to form horizontal grooves, and top and bottom walls having their edges seated in said grooves.

4. An animal trap, comprising a rectangular receptacle open at one end, the side walls being formed of sheet metal and each having an integral tongue bent inwardly at said open end, said tongues converging toward each other and being toothed at their inner ends, said side walls being flanged at their upper and lower edges and the flanges being bent upon themselves longitudinally to form horizontal grooves, and top and bottom walls having their edges seated in said grooves, one of said top and bottom walls being divided into two parts, one of which is slidable in the grooves of said side walls.

5. An animal trap, comprising a receptacle having walls and open at one end, opposite walls of said receptacle being bent upon themselves along corresponding edges for slidably engaging the edges of a third wall, and a spring tongue extending inwardly of said open end, said tongue having prongs at its end and converging toward the opposite wall.

Signed at Chicago this 5th day of December, 1907.

GEORGE ELSEY.
BENJAMIN J. WAYT.

Witnesses:
E. A. RUMMLER,
MARY M. DILLMAN.